A. A. LANDON.
CONTROLLING DEVICE FOR MOLD JARRING MACHINES.
APPLICATION FILED OCT. 18, 1916.
1,279,368.
Patented Sept. 17, 1918.
2 SHEETS—SHEET 1.
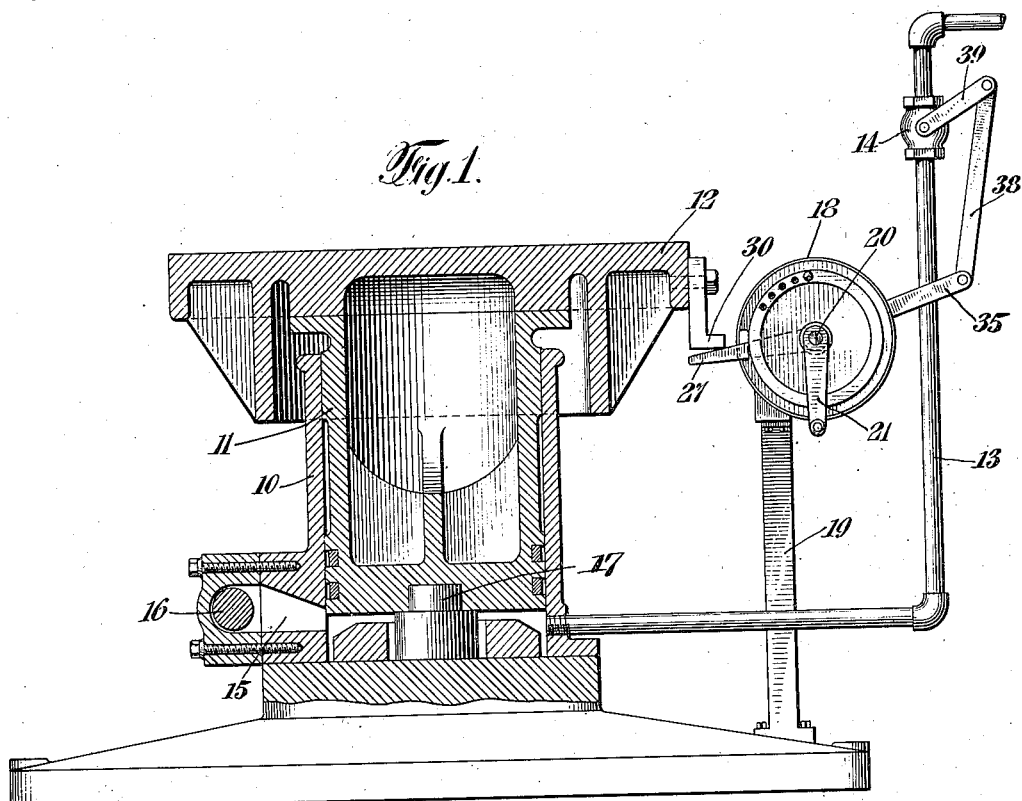
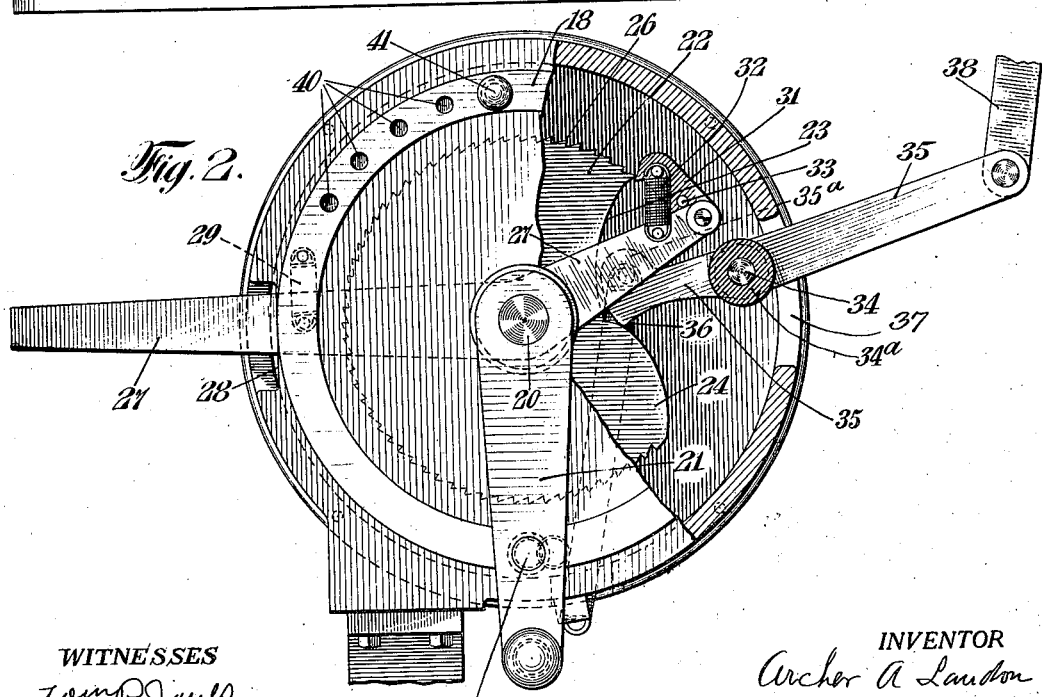
WITNESSES
INVENTOR
Archer A. Landon
BY
Conrad A. Dieterich
ATTORNEY

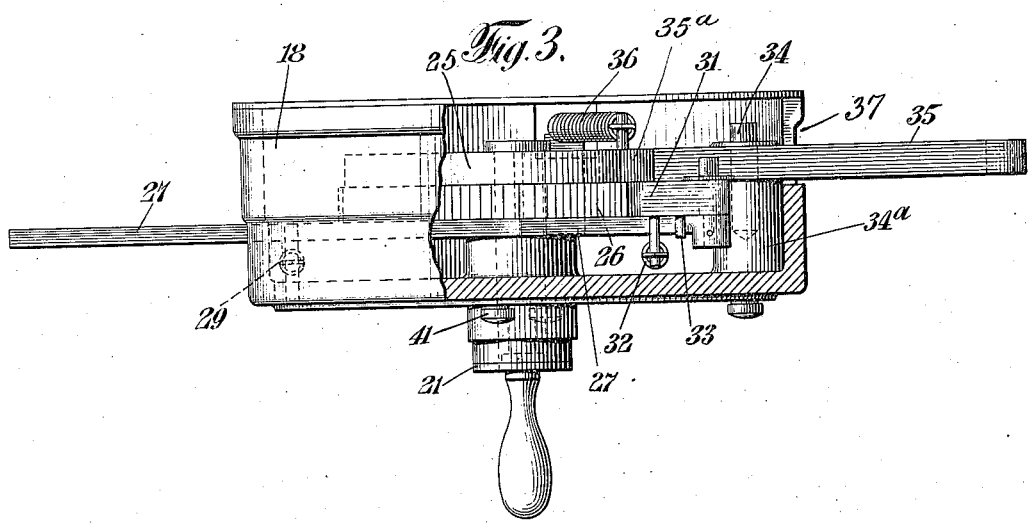
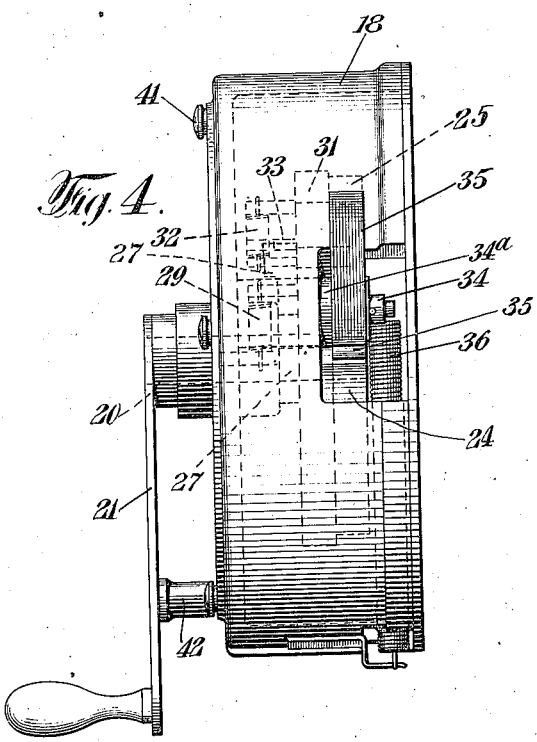

UNITED STATES PATENT OFFICE.

ARCHER A. LANDON, OF BUFFALO, NEW YORK, ASSIGNOR TO AMERICAN RADIATOR COMPANY, OF CHICAGO, ILLINOIS, A CORPORATION OF NEW JERSEY.

CONTROLLING DEVICE FOR MOLD-JARRING MACHINES.

1,279,368.   Specification of Letters Patent.   Patented Sept. 17, 1918.

Application filed October 18, 1916.   Serial No. 126,333.

*To all whom it may concern:*

Be it known that I, ARCHER A. LANDON, a citizen of the United States, residing at Buffalo, Erie county, in the State of New York, have invented certain new and useful Improvements in Controlling Devices for Mold-Jarring Machines, of which the following is a full, clear, and exact specification.

My invention relates to improvements in means for controlling the successive or repeated movements of mechanisms, and the same has for its object more particularly to provide a simple, efficient and positive apparatus for controlling the movement of the table or support of a machine for jarring molds, or other bodies.

Further, said invention has for its object to provide an apparatus which may be so adjusted in advance that when any predetermined number of movements, or operations or reciprocations of a support have occurred, said apparatus will automatically cause the further operation or movement of said support to cease.

Further, said invention has for its object to provide an apparatus which is actuated by the movements of a table or support itself for controlling the number of operations or reciprocations of said table or support.

Further, said invention has for its object to provide an apparatus of the character specified whereby the movable table, support or other body may be actuated any predetermined number of times, at will, between certain limits.

Further, said invention has for its object to provide a controlling apparatus which will automatically operate the valve or device controlling the source of power for the jarring machine so as to discontinue the operation of said machine when it has completed the jarring operation.

Further, said invention has for its object to provide an apparatus for automatically controlling the flow of the operating fluid to the reciprocating table.

Other objects of the invention will in part be obvious and in part be pointed out in the claims.

To the attainment of the aforesaid objects and ends my invention consists in the novel details of construction, and in the combination, connection and arrangement of parts hereinafter more fully described and then pointed out in the claims.

In the accompanying drawings, wherein is shown an illustrative embodiment of the invention,—

Figure 1 is a view showing the improved controlling device as applied to a mold jarring machine, the machine being shown in section;

Fig. 2 is a front view of the controlling device, parts being broken away.

Fig. 3 is a top plan view thereof, parts being broken away, and

Fig. 4 is a side view thereof as seen from the right of Fig. 2.

Referring to the drawings the controlling device is shown by way of example, in connection with a machine for jarring molds, comprising essentially a tubular support 10, within which is positioned the plunger 11 of a reciprocatable table 12 serving to support the pattern and flask which are to be subjected to the jarring motion. A pipe 13 for supplying fluid under pressure communicates with the interior of the tubular support 10 adjacent the lower end thereof, and the flow of the fluid through said pipe is controlled by a normally closed valve 14. Leading from the tubular support is an exhaust passage 15 controlled by a valve 16 which is alternately automatically opened and closed to permit the table 12 to be reciprocated when said valve 14 is opened to allow the fluid under pressure to be admitted into the tubular support 10. When the valve 16 is in its closed position the table will be raised by the incoming fluid, and when the valve 16 is opened the table will descend; the desired jarring action being produced by the striking of a stop 17, carried by the plunger, against the bottom of the chamber within the tubular support.

The controlling device comprises a cylindrical casing 18 supported upon a bracket 19 which is preferably secured to the base of the machine. Rotatably supported by the casing 18 is a shaft 20 having one end projecting beyond the casing and provided with an operating handle 21. Secured to the shaft 20, and within the casing 18, is a controlling member 22 in the form of a mutilated disk having a cut away portion 23 and a cam 24. A portion of the periphery of the member 22 is provided with a smooth surface 25 forming a continuation of the cam, while the remaining portion thereof is provided with a series of teeth 26.

110

Loosely mounted upon the shaft 20 is a lever 27 one arm of which extends through an opening 28 formed in the casing 18 and is constantly urged to occupy its raised position by means of a spring 29 one end of which is secured to the arm and the other end of which is secured to the casing. The outer end of said arm is adapted to be engaged by the table 12, or by a clip 30 secured thereto, so that as the table 12 descends the outer end of the arm will be depressed. As the table rises, said arm will be raised by the means of the spring 29, and consequently the reciprocating movement of the table will result in a rocking movement of the lever 27 about the shaft 20. The inner arm of the lever 27 carries a pawl 31 which is adapted to engage the teeth 26 on the periphery of the controlling member 22 and which is yieldingly held in its operative position by a spring 32 secured to the pawl and to the lever 27. The inward movement of the pawl 31 is limited by means of a stop 33 carried by the pawl and adapted to engage the lever 27.

Pivotally mounted upon a stud 34 secured within the casing 18, is a cam lever 35 the inner end 35ª of which is adapted to engage either with the portion 24 of the cam or with the portion 25 thereof, being held in its engaging position by a spring 36 secured to the casing and to said inner end. The outer end of said cam lever 35, which extends through an opening 37 in the casing 18, is connected by links 38 and 39 to the valve 14 in the pipe 13 leading from the source of fluid supply. In the normal position of the cam lever 35 the inner end 35ª thereof is held in its lowered position in engagement with the portion 24 of the cam as shown in Fig. 2, and when in this position its outer end is raised, the links 38 and 39 being so arranged that the valve 14 will be closed. Upon rotating the handle 21 and the controlling member 22 in an anti-clockwise direction the inner end 35ª of the cam lever 35 will be forced upward by the action of the portion 24 of the cam, and upon further movement of the controlling member, the said inner end of the cam lever will engage the portion 25 of the cam and be maintained in its raised position. As the cam lever 35 rotates about the stud 34 its outer end will be depressed, and through the action of the links 38 and 39 the valve 14 will be opened to admit fluid into the tubular support 10.

The operation of the device is as follows:—

Assuming the parts to be in their normal positions, as shown in Fig. 2, when it is desired to reciprocate the table 12, the handle 21 together with the shaft 20 and the controlling member 22 are rotated in an anti-clockwise direction until the toothed portion of the periphery of the controlling member 22 is brought into engagement with the pawl 31, and at the same time, the inner end 35ª of the cam lever 35 will be raised and will engage the portion 25 of the cam, as above described, thereby causing the valve 14 to be opened. Upon the opening of said valve, fluid under pressure is admitted into the tubular support 10 through the pipe 13, and the table 12 will be reciprocated in the well-known manner, each downward movement ending with a jarring closing. During each reciprocation of the table 12 the lever 27 will be oscillated about its support, as above described, and cause the pawl 31, which is in engagement with the series of teeth 26, to rotate the controlling member in an anti-clockwise direction, such member being rotated the distance of one tooth for each complete oscillation of the lever 27. This step-by-step rotary movement of the controlling member 22 will continue until the controlling member and the handle 21 have been returned to their normal or initial positions at which time the last tooth of the series of teeth 26 will have been brought into registry with the pawl 31. At the same time the cut away portion 23 of the controlling member 22 will have been brought into registry with the inner end 35ª of the cam lever 35, and the said inner end of the cam lever will be drawn quickly of the cam lever will be drawn quickly downward into its normal position thereby raising the outer end thereof and closing the valve 14 whereby the supply of fluid to the tubular portion 10 of the jarring machine is shut off or so controlled that the jarring operation of the machine is terminated.

The number of reciprocations of the table 12, and, therefore, the number of jolts, imparted to the pattern and flask carried by the table, can be varied at will depending upon the arc through which the handle 21 and the controlling member 22 are initially turned by hand when starting the operation of the machine. For example, assuming the teeth 26 to be seventy, in number, if the handle and the controlling member are turned by hand to place the first tooth in engagement with the pawl 31, the table will be reciprocated seventy times before the operation of the machine is stopped by the action of the valve. If, however, the handle and the controlling member are turned by hand, for example, to cause thirty of the teeth to pass the pawl 31, the table will be reciprocated only forty times before the machine is brought to rest. It will thus be seen that the device may be set to cause any predetermined number of jolts, not exceeding the number of teeth, to be imparted to the pattern and flask. This feature of the invention is very advantageous as it has been found in practice that if the pattern is subjected to too many jolts the sand will become packed so tightly therein that the gases from the molten metal which is poured into the mold can not escape; as a result thereof an explosion or distortion of the mold is liable to result.

In order to be able quickly and readily to set the handle and controlling member at the proper positions to insure the desired number of jolts being imparted to the pattern, the casing 18 is provided with a series of holes 40, positioned concentrically with respect to the shaft 20, any one of which is adapted to receive a removable pin 41. The handle 21 is provided with a stud 42 adapted to contact with the pin 41 and the heads of the pin and stud are beveled or tapered so that the stud may slide over the pin. Each of the holes 40 is so positioned as to cause a certain number of jolts to be imparted to the machine when the handle 21 is rotated to bring the stud 42 carried thereby into contact with the pin 41. For example, the first hole, counting from the right, may both indicate sixty jolts and cause that number to be imparted to the machine; the second hole, fifty, and so on. If it is desired to impart fifty jolts to the machine the pin 41 will be inserted in the second one of the holes 40, and the handle 21 rotated by hand until the stud 42 contacts the pin 41. The device will then operate as above set forth, the stud 42 sliding over the pin 41 during the first movements of the pawl 31. After fifty jolts have been imparted to the machine, the parts will have returned to their normal or initial positions and the operation of the jarring machine will be stopped.

Having thus described my said invention, what I claim and desire to secure by Letters Patent is:—

1. The combination of a machine of the character described having a periodically operating member and means for controlling the operation thereof, with a movable member, means for effecting a uni-directional movement of said movable member, and means operatively associated with said movable member to render said controlling means operative and inoperative, said last mentioned means being automatically actuated to render said controlling means operative during the initial movement of said movable member and being actuated to render said controlling means inoperative at the termination of the complete movement of said movable member, substantially as specified.

2. The combination of a machine of the character described having a periodically operating member and means for controlling the operation thereof, with a rotatable member, means for effecting a complete revolution of said rotatable member, and means operatively associated with said rotatable member to render said controlling means operative and inoperative, said last mentioned means being automatically actuated to render said controlling means operative during the initial movement of said rotatable member and being actuated to render said controlling means inoperative at the termination of the complete revolution of said rotatable member, substantially as specified.

3. The combination of a machine of the character described having a periodically operating member and means for controlling the operation thereof, with a movable member, means for initially moving said movable member, means controlled by said periodically operating member to move said movable member a predetermined extent after the initial movement thereof, and means operatively associated with said movable member to render said controlling means operative and inoperative, said last mentioned means being automatically actuated to render said controlling means operative during the initial movement of said movable member and being actuated to render said controlling means inoperative at the termination of the movement of said movable member, substantially as specified.

4. The combination of a machine of the character described having a reciprocatable member and means for controlling the operation thereof, with a movable member, means for initially moving said movable member, means controlled by said reciprocatable member to move said movable member a predetermined extent after the initial movement thereof, and means operatively associated with said movable member to render said controlling means operative and inoperative, said last mentioned means being automatically actuated to render said controlling means operative during the initial movement of said movable member and being actuated to render said controlling means inoperative at the termination of the movement of said movable member, substantially as specified.

5. The combination of a machine of the character described having a fluid operated member and means for controlling the flow of fluid thereto, with a movable member, means for initially moving said movable member, means controlled by said fluid operated member to move said movable member a predetermined extent after the initial movement thereof, and means operatively associated with said movable member to render said controlling means operative and inoperative, said last mentioned means being automatically actuated to render said controlling means operative during the initial movement of said movable member and being actuated to render said controlling means inoperative at the termination of the movement of said movable member, substantially as specified.

6. The combination of a machine of the character described having a reciprocatable member and means for controlling the operation thereof, with a rotatable member, means for initially rotating said rotatable member for a portion of a complete revolution, means controlled by said reciprocatable member for rotating said rotatable member for the remainder of such complete revolution, and means operatively associated with said rotatable member to render said controlling means operative and inoperative, said last mentioned means being automatically actuated to render said controlling means operative during the initial movement of said rotatable member and being actuated to render said controlling means inoperative at the termination of the complete revolution of said rotatable member, substantially as specified.

7. The combination of a machine of the character described having a fluid operated member and means for controlling the flow of fluid thereto, with a rotatable member, means for initially rotating said rotatable member for a portion of a complete revolution, means controlled by said fluid operated member for rotating said rotatable member for the remainder of such complete revolution, and means operatively associated with said rotatable member to render said controlling means operative and inoperative, said last mentioned means being automatically actuated to render said controlling means operative during the initial movement of said rotatable member and being actuated to render said controlling means inoperative at the termination of the complete revolution of said rotatable member, substantially as specified.

8. The combination of a machine of the character described having a reciprocatable member, with a rotatable member comprising a series of teeth, a pawl coöperating with said teeth to rotate said rotatable member, pawl operating means controlled by the movement of said reciprocatable member, means for initially rotating said rotatable member to set the same with any desired one of said series of teeth in engagement with said pawl, and means controlled by said rotatable member to stop the movement of said reciprocatable member when said rotatable member has been rotated a predetermined extent, substantially as specified.

9. The combination of a machine of the character described having a fluid operated reciprocatable member, and a valve for controlling the flow of fluid thereto, with a rotatable member, means for initially rotating said rotatable member for a portion of a complete revolution, means controlled by said reciprocatable member for rotating said rotatable member for the remainder of such complete revolution, and valve operating means controlled by said rotatable member to open and close said valve, said valve operating means being automatically actuated to open said valve during the initial movement of said rotatable member and to close said valve at the termination of the complete revolution thereof, substantially as specified.

10. The combination of a machine of the character described having a fluid operated reciprocatable member, and a valve for controlling the flow of fluid thereto, with a rotatable member, means for initially rotating said rotatable member for a portion of a complete revolution, means controlled by said reciprocatable member for rotating said rotatable member for the remainder of such complete revolution, said rotatable member comprising a cam, and valve operating means controlled by said cam to open and close said valve, said cam being shaped to actuate said valve operating means to open said valve during the initial movement of said rotatable member and to permit said valve operating means to return to its valve closing position at the termination of the complete revolution of said rotatable member, substantially as specified.

Signed at the city of Buffalo, Erie county, in the State of New York, this 17th day of February, one thousand nine hundred and sixteen.

ARCHER A. LANDON.

Witnesses:
CHAS. E. HANBACH,
CONRAD A. DIETERICH.

It is hereby certified that in Letters Patent No. 1,279,368, granted September 17, 1918, upon the application of Archer A. Landon, of Buffalo, New York, for an improvement in "Controlling Devices for Mold-Jarring Machines," errors appear in the printed specification requiring correction as follows: Page 2, lines 77–78, for the word "closing" read *action;* same page, line 86, for the compound word "step-my-step" read *step-by-step*, and same page, line 118, for the word "action" read *closing;* and that the said Letters Patent should be read with these corrections therein that the same may conform to the record of the case in the Patent Office.

Signed and sealed this 15th day of October, A. D., 1918.

[SEAL.]

R. F. WHITEHEAD,

*Acting Commissioner of Patents.*

Cl. 121—19.